March 4, 1952 W. A. DUFFIELD 2,588,220
AUTOMATIC VARIABLE-SPEED TRANSMISSION
Filed Aug. 19, 1946 2 SHEETS—SHEET 1

INVENTOR
William A. Duffield.
By Robert Duncan
AGENT.

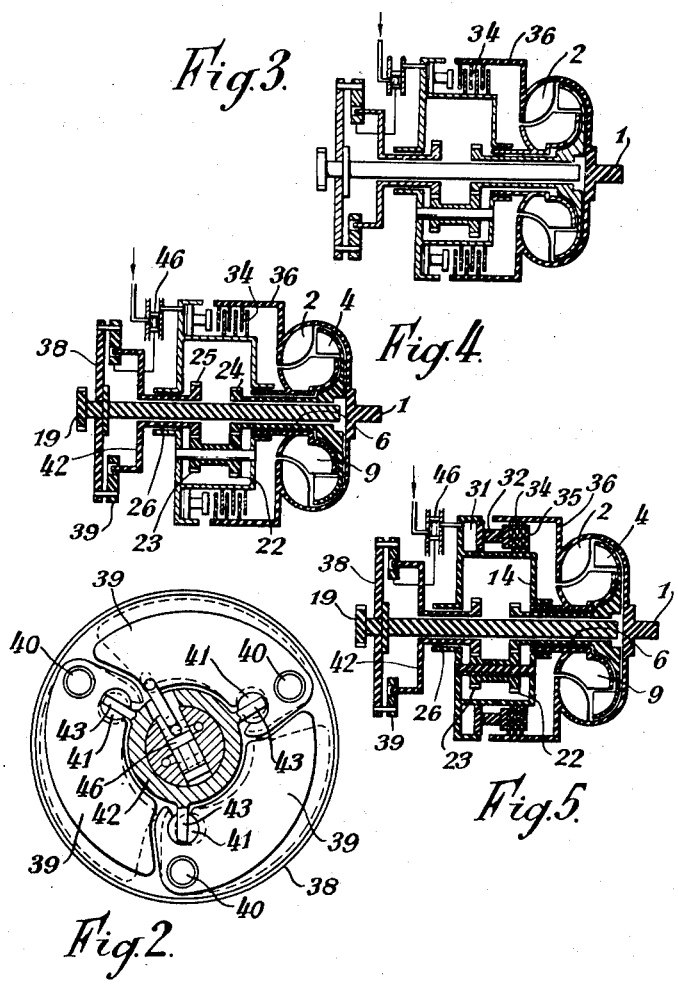

Patented Mar. 4, 1952

2,588,220

UNITED STATES PATENT OFFICE 2,588,220

AUTOMATIC VARIABLE-SPEED TRANSMISSION

William A. Duffield, Windsor, Ontario, Canada, assignor to Windfields Limited, Montreal, Quebec, Canada, a company Application August 19, 1946, Serial No. 691,487

8 Claims. (Cl. 74—677)

This invention relates to automatic variable speed transmissions incorporating a fluid torque converter and reduction gearing.

From developments carried out to date it does not seem practical to use a hydro-kinetic torque converter as the sole means of power transmission in automotive vehicles under all operating conditions, as the requirements of a high starting torque, a wide range of torque multiplication, and a high average operating efficiency cannot be satisfactorily met. However the fluid torque converter lends itself admirably to use as a means of shock free starting and acceleration of the vehicle up to a point.

The object of this invention is to provide means whereby the overall efficiency of the fluid torque converter is improved and an automatic means provided for the operation of the auxiliary gear unit.

A further object of the invention is to provide a means whereby, when the transmission system operates in direct drive, the fluid torque converter assumes only a portion of the torque being transmitted.

A novel feature of this design is the coupling of the fluid torque converter reaction member to the gear carrier reaction member of the reduction gearing, thereby making it possible to connect one side of an automatic clutch, illustrated and described as being hydraulically actuated, directly to the input member for direct drive. This coupling makes possible the splitting of the input torque during direct drive, whereby only a portion of the driving torque, depending upon the gear ratio used, passes through the fluid torque converter thereby greatly increasing its efficiency, and keeping the converter active in the circuit at all times so that it may assume immediately a full torque load when called upon to do so.

The invention is illustrated in the drawings of which Figure 1 is a vertical longitudinal section of the transmission assembly.

Figure 2 is a sectional view on the line 2—2 of Figure 1 showing in full lines the position of the governor weights and valve when the transmission is at rest or running at slow speed, and in dotted lines, the position of the weights and valve when the transmission is in direct drive.

Figure 3 is a diagram of the transmission showing in heavy lines the elements of the transmission showing in heavy lines the elements of the transmissions which are rotated when the engine or prime mover is idling and the shift lever is in neutral.

Figure 4 is a diagram similar to Figure 3 showing in heavy lines the elements of the transmission which are rotated at any speed below that at which centrifugal force overcomes the torque and causes displacement of the governor weights.

Figure 5 is a diagram similar to Figure 4 but showing the governor weights displaced effecting automatic engagement of the clutch. The transmission now being in direct drive and torque is being transmitted through the clutch and gearing.

Figure 1:
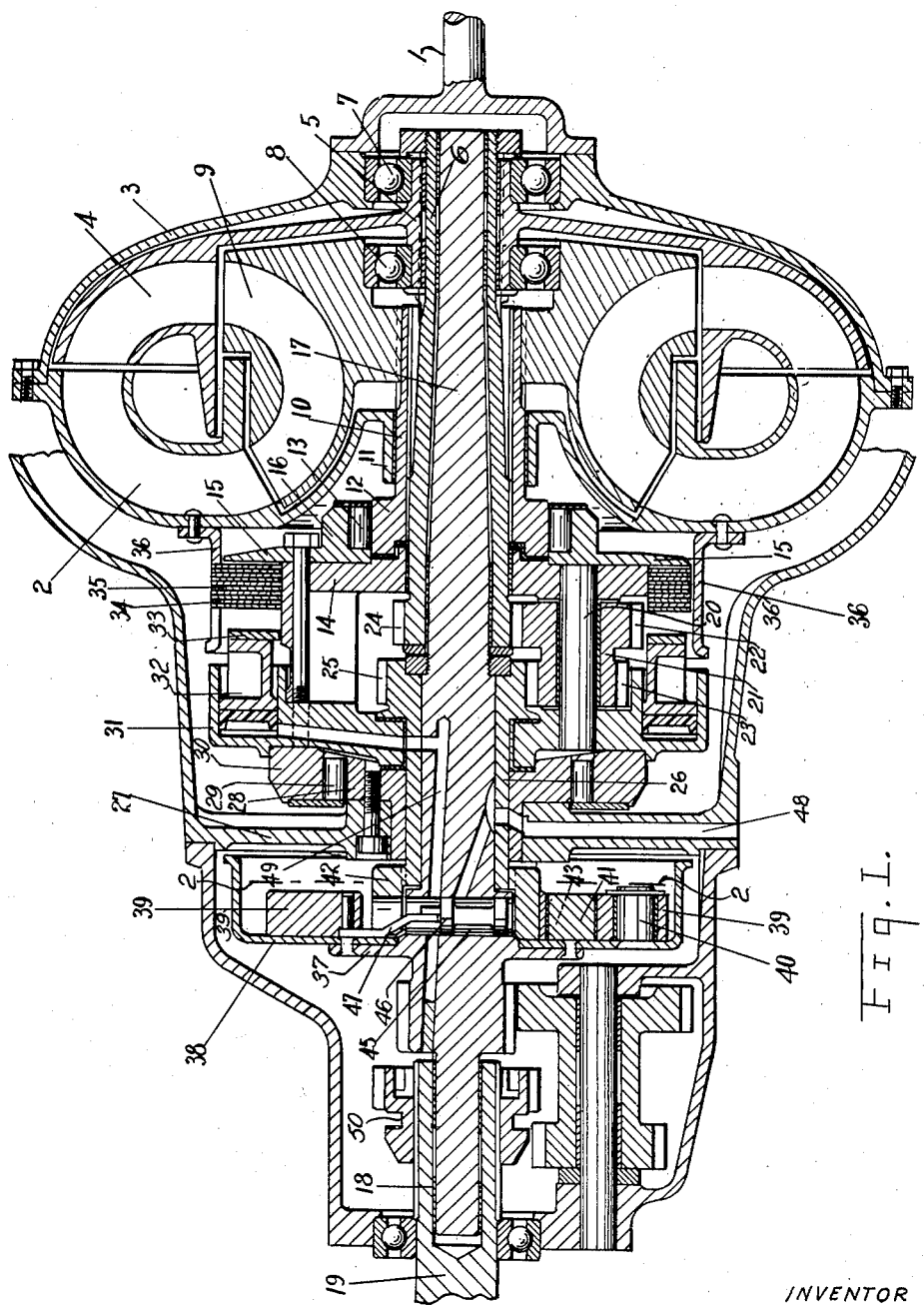

Referring to the drawings, the input shaft 1 is coupled to the impeller 2 through the housing 3 of the fluid torque converter, of which a typical form is illustrated. The runner member 4 of the fluid torque converter is provided with an axial sleeve 5 which is splined to the hollow shaft 6. The sleeve 5 provides a seat for the main bearing 7 on which the housing 3 of the converter is journalled. The sleeve 5 also provides a seat for the bearing 8 on which the reaction member 9 of the fluid torque converter is journalled.

The reaction member 9 is splined to the hollow shaft 10 which in turn is journalled on the shaft 6. The impeller 2 is journalled on the hollow shaft 10 at 11. The hollow shaft 10 terminates in the inner race 12 of the overrunning clutch 13.

A gear carrier 14 is journalled on the hollow shaft 6 and has secured to it a clutch backing plate 15 which also acts as the outer race 16 for the overrunning clutch 13.

The main transmission shaft 17 is journalled in the hollow shaft 6 at its forward end, and at its rear end it is journalled in the pilot bearing 18 of the tail shaft 19.

The gear carrier 14 supports the journal pins 20 of which there are preferably three in number. Each pin 20 carries a reduction gear unit 21 comprising two gears 22 and 23 of unequal pitch diameter. The gear 22 meshes with the pinion 24 which is integral with the hollow shaft 6, while the gear 23 meshes with the pinion 25 which is integral with the torque spider sleeve 26.

The torque spider sleeve 26 is journalled in the flanged portion 27 of the main transmission casing. An extension boss 28 from the main casing provides the inner or static race for the one-way brake 29. The gear carrier 14 is also journalled on the torque spider sleeve 26 and is provided with an extension ring 30 forming the outer or moving race for the one-way brake 29.

The hydraulic pressure clutch cylinder 31 is formed in the gear carrier 14 and is annular in form. The annular piston 32 is provided with a pressure plate 33 adapted to contact and close the clutch plates 34 and 35 against each other when the piston 32 is moved forward under pressure. The clutch plates 34 are mounted in the driving ring 36 which is secured to the wall of the impeller 2, while the clutch plates 35 are mounted in the gear carrier 14.

The main transmission shaft 17 is flanged at 37 to provide a carrier for the drum 38. Torque and speed sensitive governor weights 39 are pivoted on the face of the drum 38 through the pivot pins 40. The weights 39 are bored out to receive the fulcrum blocks 41. The torque sleeve 26 is splined to the torque spider 42 whose radiating arms 43 fit in slots in the fulcrum blocks 41.

The shaft 17 is bored transversely in the same plane as the governor weights 39 to form the cylinder 45 in which reciprocates the piston valve 46. Movement of the valve 46 is controlled by one of the weights 39 through the connecting link 47. This valve 46 controls the flow of fluid from the oil pressure line 48 to the feed line 49 leading to the cylinder 31 of the hydraulically actuated clutch.

A suitable reverse gear 50 is provided for the transmission in which is incorporated forward and reverse changeover mechanism having a positive neutral position.

In the operation of this invention a conventional form of fluid torque converter has been illustrated, but the invention can be applied and used with any form of fluid torque converter in which the reaction member runs with the runner when the output torque equals or drops below the input torque.

In order to clearly understand the nature and operation of this invention particular reference is made to the diagrams, Figures 3, 4 and 5 in the drawings. In all of these diagrams the elements which rotate are shown in heavy lines. In Figures 3 and 4 which represent idling and low speed operations respectively, the weights are in the withdrawn or torque controlled position. In this position of the weights the valve 46 blocks the passage of fluid under pressure from reaching the cylinder 31 of the hydraulically actuated clutch, consequently the clutch cannot be engaged. Whereas, in Figure 5 where the torque, tending to hold the weights in the withdrawn position, is overcome by centrifugal force, the weights 39 move outwardly, causing displacement of the valve 46 and opening the passage 49 for the fluid under pressure to reach the cylinder 31. The inflow of fluid under pressure causing displacement of the piston 32 to effect engagement of the clutch plates 34 and 35. The clutch is now engaged and the transmission is in direct drive.

In all these diagrams, unnecessary detail, such as the overrunning clutch and brake and the transmission casing, have been omitted.

When the prime mover is first started up, the shift lever not illustrated, for unit 50 is set in the neutral position. The operation is then as illustrated in the diagram Figure 3. The input shaft 1 is rotated and carries with it the casing or housing 3 of the fluid torque converter. The impeller 2, formed in the housing 3, and the drive ring 36 rotate with and at the same speed as the input shaft 1, as also do the clutch plates 34 which are mounted on the drive ring 36. So long as the impeller 2 is just turning over, no power is transmitted through the torque converter.

When the shift lever for unit 50 is moved to either the forward or reverse positions and the speed of the input shaft 1 is increased, multiplied torque is transmitted from the fluid torque converter to the shaft 6 and in turn is transmitted through the reduction gearing composed of pinion 24, cluster gears 22 and 23 and the output gear 25. From the output gear 25 the torque is transmitted through the torque spider sleeve 26 to the torque spider 42 and thence through the governor weights 39 and drum 38 to the tail shaft 19. This phase of the operation is illustrated in the diagram Figure 4. The reaction of the fluid torque converter is transmitted from the fluid torque converter reaction member 9, through the hollow shaft 10, overrunning clutch members 12, 13 and 16 to the gear carrier 14, thence through the gear carrier one-way brake members 30, 29 and 28 to the frame 27. The reaction of the reduction gearing in the gear carrier 14 is taken directly into the frame by means of the one-way brake 29.

As the speed of the unit increases, the torque transmitted through the fluid torque converter decreases and the speed differential between the impeller 2 and the runner 4 approach equal R. P. M.

The reaction member 9 of the fluid torque converter is free to run with the runner 4 by means of the overrunning clutch 13. A further increase in the speed of the unit, and or, a further drop in torque causes the speed-torque sensitive governor weights 39 to overcome the resistance of the torque spider 42 and move outwards. This outward movement of the weights 39 causes displacement of the valve 46, allowing pressure fluid to pass into the cylinder 31 to effect displacement of the piston 32 and engagement of the clutch 34, 35. When this occurs, the gear carrier 14 is directly coupled with the input power source. The unit is now functioning in direct drive, less the slip of the fluid torque converter. This phase of the operation is illustrated in the diagram Figure 5.

The input torque now reaching the speed-torque sensitive governor is divided, a portion is now transmitted from the prime mover through the housing of the fluid torque converter directly to the drive ring 36, then through the clutch plates 34 and 35, gear carrier 14, pins 20, gear 23 and output gear 25 and thence through the torque spider sleeve 26, torque spider 42, governor weights 39 through the drum 38 to the tail shaft 19. The other portion of the input torque passes from the impeller 2 through the fluid torque converter runner member 4, hollow shaft 6, pinion 24 and gears 22 and 23 to the output gear 25, where it combines again with the other portion to pass through the speed-torque sensitive governor to the tail shaft 19.

It is now apparent that the fluid torque converter does not carry full input torque, but only a portion thereof, depending upon the ratio employed in the gear reduction unit, when the transmission is in direct drive. Under these circumstances, the fluid torque converter is always active in the circuit and ready to do its full duty at all times.

What I claim is:

1. In an automatic variable speed transmission, a fluid torque converter comprising an impeller, a runner member and a reaction member, a gear reduction unit, a gear carrier supporting said gear reduction unit, an operable connection between the runner member of the fluid torque converter and the gear reduction unit, an automatically operated clutch forming an operable connection between the impeller of the fluid torque converter and the gear carrier, an output shaft, and a governor controlling the operation of said clutch, said governor being connected on one side with said output shaft and on the other side with the runner member through the gear reduction unit for low speed drive and with the runner member and the impeller through the clutch and gear carrier for direct drive.

2. In an automatic variable speed transmission, a static casing housing said transmission, a fluid torque converter comprising an impeller, a runner member and a reaction member, a gear reduction unit, a gear carrier supporting said gear reduction unit, an overrunning clutch between said gear carrier and said reaction member, a one-way brake between the gear carrier and the static casing of the transmission, an operable connection between the runner member of the fluid torque converter and the gear reduction unit, an automatically operated clutch forming an operable connection between the impeller of the fluid torque converter and the gear carrier, an output shaft, and a governor controlling the operation of said clutch, said governor being connected on one side with said output shaft and on the other side with the runner member through the gear reduction unit for low speed drive and with the runner member and the impeller through the clutch and gear carrier for direct drive.

3. In an automatic variable speed transmission incorporating a fluid torque converter having a runner member, a gear reduction unit driven by the runner member of the fluid torque converter, a driven shaft, a gear carrier supporting said gear reduction unit, a hydraulically operated clutch situated between said gear carrier and the input side of the fluid torque converter, a governor controlling said clutch to effect transmission of torque from the runner member of the fluid torque converter through the gear reduction unit and governor to the driven shaft for low speed drive and to by-pass a portion of the torque from the input side of the fluid torque converter through the gear carrier and governor to the driven shaft for direct or high ratio drive.

4. In an automatic variable speed transmission having a static frame incorporating a fluid torque converter having a runner member and a reaction member, a gear reduction unit driven by the runner member of the fluid torque converter, a gear carrier supporting said gear reduction unit, a driven shaft, a hydraulically operated clutch between said gear carrier and the input side of the fluid torque converter, an overrunning clutch between the reaction member of the fluid torque converter and the gear carrier, a one-way brake between the gear carrier and the static frame of the transmission, and a governor controlling said hydraulically operated clutch to effect transmission of torque from the runner member of the fluid torque converter through the gear reduction unit and governor to the driven shaft for low speed drive and to by-pass a portion of the torque from the input side of the fluid torque converter through the gear carrier and governor to the driven shaft for direct or high ratio drive.

5. In an automatic variable speed transmission having a static frame incorporating a fluid torque converter and a gear reduction unit, a gear carrier supporting said gear reduction unit, a driven shaft, means to transmit the reaction of the fluid torque converter through said gear carrier to the static frame of the transmission, a speed-torque sensitive governor forming a drive connection between the output side of the gear reduction unit and the driven shaft, and a clutch controlled by said governor, coupling the input side of the fluid torque converter and the gear carrier with the output side of the gear reduction unit to carry a portion of the input torque, normally passing through the gear reduction unit, direct through the governor to the driven shaft for direct or high ratio drive.

6. In an automatic variable speed transmission having a static frame incorporating a fluid torque converter having an impeller, a reaction member and a runner member, a gear reduction unit, the input side of which is operably connected with said runner member, a gear carrier supporting said gear reduction unit, said gear carrier adapted to be rotated in one direction only by the reaction member of the fluid torque converter when the reaction member and the runner member are rotating at equal speed, a one-way brake between the gear carrier and the static frame of the transmission, a tail shaft, a speed-torque sensitive governor forming a torque transmission member from the gear reduction unit and fluid torque converter to the tail shaft, and a clutch, controlled by said governor, said clutch, when engaged by the action of the governor, forming a connection between the impeller of the fluid torque converter and the gear carrier and a path for a portion of the input torque from the fluid torque converter to pass directly to the output side of the gear reduction unit.

7. In an automatic variable speed transmission having a static frame incorporating a fluid torque converter having an impeller, a reaction member and a runner member, a gear reduction unit, the input side of which is operably connected with said runner member, a gear carrier supporting said gear reduction unit, said gear carrier adapted to be rotated in one direction only by the reaction member of the fluid torque converter when the reaction member and runner member are rotating at equal speed, a one-way brake between the gear carrier and the static frame of the transmission, a tail shaft, a speed-torque sensitive governor forming a torque transmission member from the gear reduction unit and fluid torque converter to the tail shaft, a driving ring on said impeller, and a clutch comprising interleaved plates mounted on said driving ring and on the gear carrier, said clutch being automatically controlled by said governor to lock the gear carrier to the input side of the fluid torque converter and forming a path for a portion of the input torque from the fluid torque converter to pass directly to the output side of the gear reduction unit.

8. In an automatic variable speed transmission, a fluid torque converter having an impeller, a reaction member and a runner member, a gear carrier, a gear reduction unit supported in said gear carrier transmitting torque delivered from the runner member of the fluid torque converter, a tail shaft, a governor forming a torque transmitting means between the output side of the gear reduction unit and said tail shaft for low speed drive, and means controlled by said governor connecting the impeller side of the fluid torque converter with the gear carrier and the output side of the gear reduction unit to form a secondary torque path to that passing through the gear reduction unit for direct or high ratio drive.

WILLIAM A. DUFFIELD.

REFERENCES CITED

The following references are of record in the file of this patent:

UNITED STATES PATENTS

| Number | Name | Date |
|---|---|---|
| 2,143,312 | Griswold | Jan. 10, 1939 |
| 2,156,041 | Duffield | Apr. 25, 1939 |
| 2,206,859 | Duffield | July 2, 1940 |
| 2,280,015 | Tipton | Apr. 14, 1942 |
| 2,301,451 | Pollard | Nov. 10, 1942 |
| 2,312,849 | Pollard | Mar. 2, 1943 |
| 2,324,713 | McFarland | July 20, 1943 |
| 2,339,626 | Duffield | Jan. 18, 1944 |
| 2,351,213 | James | June 13, 1944 |
| 2,360,646 | Carnagua | Oct. 17, 1944 |
| 2,465,739 | McGill | Mar. 29, 1949 |

FOREIGN PATENTS

| Number | Country | Date |
|---|---|---|
| 441,549 | Germany | Mar. 10, 1927 |
| 625,416 | Great Britain | June 28, 1949 |